US012583264B2

(12) United States Patent
Naruse et al.

(10) Patent No.: US 12,583,264 B2
(45) Date of Patent: Mar. 24, 2026

(54) PNEUMATIC TIRE

(71) Applicant: The Yokohama Rubber Co., LTD.,
Tokyo (JP)

(72) Inventors: Masahiro Naruse, Hiratsuka (JP);
Takashi Hoshiba, Hiratsuka (JP)

(73) Assignee: The Yokohama Rubber Co., LTD.,
Tokyo (JP)

( * ) Notice: Subject to any disclaimer, the term of this
patent is extended or adjusted under 35
U.S.C. 154(b) by 589 days.

(21) Appl. No.: 16/757,361

(22) PCT Filed: Oct. 17, 2018

(86) PCT No.: PCT/JP2018/038739
§ 371 (c)(1),
(2) Date: Apr. 17, 2020

(87) PCT Pub. No.: WO2019/078282
PCT Pub. Date: Apr. 25, 2019

(65) Prior Publication Data
US 2020/0346493 A1 Nov. 5, 2020

(30) Foreign Application Priority Data

Oct. 19, 2017 (JP) ................................. 2017-202644

(51) Int. Cl.
*B60C 19/00* (2006.01)
*B60C 5/00* (2006.01)
*B60C 11/03* (2006.01)
(52) U.S. Cl.
CPC ............ *B60C 19/002* (2013.01); *B60C 5/002*
(2013.01); *B60C 11/03* (2013.01); *B60C*
*2011/0353* (2013.01)

(58) Field of Classification Search
CPC ....... B60C 5/002; B60C 19/002; B60C 11/03;
B60C 2011/0353; B60C 3/04; B60C 5/00
See application file for complete search history.

(56) References Cited

U.S. PATENT DOCUMENTS 7,188,652 B2 * 3/2007 Yukawa ................ B60C 19/002
152/450
2005/0205183 A1 9/2005 Yukawa
(Continued)

FOREIGN PATENT DOCUMENTS

JP 2005-262920 9/2005
JP 2007-022445 2/2007
(Continued)

OTHER PUBLICATIONS

International Search Report for International Application No. PCT/
JP2018/038739 dated Jan. 15, 2019, 4 pages, Japan.

*Primary Examiner* — John J DeRusso
*Assistant Examiner* — Shibin Liang
(74) *Attorney, Agent, or Firm* — Thorpe North & Western

(57) ABSTRACT

A pneumatic tire comprises a tread portion extending in a
tire circumferential direction and having an annular shape; a
pair of sidewall portions disposed on opposite sides of the
tread portion; and a pair of bead portions disposed inward of
the sidewall portions in a tire radial direction; wherein a
sound absorbing member is fixed via an adhesive layer to an
inner surface of the tread portion along the tire circumfer-
ential direction, and the adhesive layer comprises a solid
pressure-sensitive adhesive without including a base mate-
rial.

13 Claims, 6 Drawing Sheets

(56)         References Cited

U.S. PATENT DOCUMENTS

| | | | |
|---|---|---|---|
| 2006/0231185 A1 | 10/2006 | Tanno | |
| 2007/0017619 A1 | 1/2007 | Yukawa | |
| 2007/0089824 A1 | 4/2007 | Yukawa | |
| 2007/0119533 A1 | 5/2007 | Yukawa | |
| 2009/0038726 A1* | 2/2009 | Yukawa | B60C 19/002 |
| | | | 152/454 |
| 2009/0277549 A1 | 11/2009 | Tanno | |
| 2010/0108224 A1 | 5/2010 | Yukawa | |
| 2010/0270101 A1 | 10/2010 | Yukawa | |
| 2012/0073717 A1 | 3/2012 | Agostini et al. | |
| 2013/0032262 A1 | 2/2013 | Bormann | |
| 2016/0001612 A1 | 1/2016 | Joo et al. | |
| 2019/0030954 A1* | 1/2019 | Nakatani | B60C 11/0041 |
| 2019/0160890 A1 | 5/2019 | Rubber | |
| 2020/0157391 A1* | 5/2020 | Lebrun | C09J 183/04 |
| 2020/0190370 A1* | 6/2020 | Watanabe | C09J 11/04 |

| | | | | | |
|---|---|---|---|---|---|
| 2020/0234686 A1* | 7/2020 | Hosoda | | | B32B 25/10 |

FOREIGN PATENT DOCUMENTS

| | | | | | |
|---|---|---|---|---|---|
| JP | 2007-112395 | 5/2007 | | | |
| JP | 2008-049749 | 3/2008 | | | |
| JP | 4281874 | 6/2009 | | | |
| JP | 2012-071601 | 4/2012 | | | |
| JP | 2013-032009 | 2/2013 | | | |
| JP | 5267288 | 8/2013 | | | |
| JP | 2015-166134 | 9/2015 | | | |
| JP | 2016246901 | * | 12/2016 | | B60C 1/00 |
| JP | 2017124191 | * | 6/2017 | | C09J 7/38 |
| JP | 6213623 | 10/2017 | | | |
| WO | WO 2005/012007 | 2/2005 | | | |
| WO | WO 2017005378 A1 | 1/2017 | | | |
| WO | WO 2018/012087 | 1/2018 | | | |

* cited by examiner

PNEUMATIC TIRE

TECHNICAL FIELD

The present technology relates to a pneumatic tire and relates particularly to a pneumatic tire that can prevent deterioration of high-speed durability.

BACKGROUND ART

Cavernous resonance caused by vibration of air in a tire cavity portion is one cause of tire noise. Cavernous resonance occurs when a tread portion of a tire that comes into contact with a road surface when the vehicle is traveling vibrates due to the unevenness of the road surface and the vibration vibrates the air in the tire cavity portion. Since sound in a particular frequency band of the cavernous resonance is perceived as noise, it is important to reduce the level of sound pressure (noise level) in the frequency band and reduce cavernous resonance.

A known technique of reducing noise caused by such cavernous resonance includes mounting a sound absorbing member made of a porous material such as sponge on an inner surface of a tread portion on a tire inner surface using an elastic band (for example, see Japan Patent No. 4281874). However, in a case where the sound absorbing member is fixed with the elastic band, the elastic band may be deformed during travel at high speeds.

Another known method directly adhering and fixing a sound absorbing member to a tire inner surface has been proposed (for example, see Japan Patent No. 5267288). However, as illustrated in FIG. 6, when an adhesive layer 5b formed of pressure-sensitive adhesives 30 and a base material 31 that is a support body that supports the pressure-sensitive adhesives 30 are used to directly attach a sound absorbing member 6 to a tire inner surface 4, heat dissipation of the tire is inhibited by the presence of the base material 31 and the base material 31 itself generates heat. Thus, high-speed durability may deteriorate.

SUMMARY

The present technology provides a pneumatic tire that can prevent deterioration of high-speed durability.

A pneumatic tire includes:

a tread portion extending in a tire circumferential direction and having an annular shape;

a pair of sidewall portions disposed on opposite sides of the tread portion; and a pair of bead portions disposed inward of the sidewall portions in a tire radial direction; wherein a sound absorbing member is fixed via an adhesive layer to an inner surface of the tread portion along the tire circumferential direction, and the adhesive layer includes a solid pressure-sensitive adhesive without including a base material.

As a result of diligent research on a pneumatic tire with a sound absorbing member attached via an adhesive layer to a tire inner surface, the present inventors discovered that adhesive strength sufficient as the adhesive layer is ensured by using the adhesive layer made of a pressure-sensitive adhesive without including a base material and deterioration of high-speed durability can be effectively prevented.

The pneumatic tire includes a tread portion extending in a tire circumferential direction and having an annular shape; a pair of sidewall portions disposed on opposite sides of the tread portion; and a pair of bead portions disposed inward of the sidewall portions in a tire radial direction; wherein a sound absorbing member is fixed via an adhesive layer to an inner surface of the tread portion along the tire circumferential direction, and the adhesive layer comprises a solid pressure-sensitive adhesive without including a base material. Thus, heat dissipation of the tire is not inhibited by the adhesive layer and the adhesive layer itself does not generate heat. Accordingly, deterioration of high-speed durability can be prevented.

In an embodiment of the present technology, the adhesive layer preferably has an average thickness of from 0.05 mm to 5.00 mm. Thus, the adhesive layer can follow the unevenness of the tire inner surface and can secure a sufficient adhesive area. The average thickness is more preferably from 0.05 mm to 1.00 mm.

In an embodiment of the present technology, the adhesive layer preferably has a peeling adhesive strength of 5 N/20 mm or greater. Thus, the fixing strength of the sound absorbing member can be maintained well, and the sound absorbing member can be prevented from being detached. The peel adhesive strength of the adhesive layer is measured in accordance with JIS (Japanese Industrial Standard)-Z0237. In other words, a PET (polyethylene terephthalate) film having a thickness of 25 μm is applied to a double-sided pressure-sensitive adhesive sheet and thus the double-sided pressure-sensitive adhesive sheet is lined with the PET film. Test pieces are prepared by cutting the lined adhesive sheet into 20 mm×200 mm-squares. The removable liner is peeled off each of the test samples, and the exposed adhesive surface is attached to a sheet of stainless steel (SUS304, BA (Bright Annealed) finish) as an attached body by rolling a 2-kg roller back and forth over it. After the test piece is held in an environment at temperature of 23° C. and relative humidity of 50% for 30 minutes, the test piece is peeled at 180° and at a tensile speed of 300 mm/minute under the environment at temperature of 23° C. and relative humidity of 50% with the use of a tensile tester in accordance with JIS-Z0237, and thus the peeling adhesive strength with respect to the SUS (stainless steel) sheet is measured.

In an embodiment of the present technology, preferably the sound absorbing member has a volume from 10% to 30% of a cavity volume of the tire. Thus, the sound absorbing effect of the sound absorbing member can be sufficiently ensured, which leads to an improvement in quietness. The cavity volume of the tire is the volume of the cavity portion formed between the tire and the rim in a state where the tire is mounted on a regular rim and inflated to the regular internal pressure. "Regular rim" is a rim defined by a standard for each tire according to a system of standards that includes standards on which tires are based, and refers to a "standard rim" in the case of JATMA (Japan Automobile Tyre Manufacturers Association, Inc.), refers to a "design rim" in the case of TRA (The Tire & Rim Association, Inc.), and refers to a "measuring rim" in the case of ETRTO (European Tire and Rim Technical Organization). However, when the tire is an original equipment tire, the volume of the cavity portion is calculated using a genuine wheel to which the tire is mounted. "Regular internal pressure" is an air pressure defined by standards for each tire according to a system of standards that includes standards on which tires are based, and refers to a "maximum air pressure" in the case of JATMA, refers to the maximum value in the table of "TIRE LOAD LIMITS AT VARIOUS COLD INFLATION PRESSURES" in the case of TRA, and refers to the "INFLATION PRESSURE" in the case of ETRTO. However, the air pressure which is displayed on the vehicle is used in a case where the tire is an original equipment tire.

In an embodiment of the present technology, preferably the sound absorbing member includes a single band-like body having a rectangular cross-sectional shape, and the band-like body forming the sound absorbing member is disposed straddling a tire equator. When the single sound absorbing member is disposed on the tire inner surface, the high-speed durability can be effectively prevented from deteriorating.

In an embodiment of the present technology, the pneumatic tire further includes a center land portion disposed on the tread portion on a tire equator and continuously extending around the tread portion around an entire tire circumference; and wherein the sound absorbing member includes a first band-like body and a second band-like body, each one having a rectangular cross-sectional shape;

the first band-like body forming the sound absorbing member is disposed on one side in a tire lateral direction with respect to a position of 40% of a width of the center land portion from one end portion of the center land portion on the one side in the tire lateral direction to the other side in the tire lateral direction;

the second band-like body forming the sound absorbing member is disposed on the other side in the tire lateral direction with respect to a position of 40% of the width of the center land portion from one end portion of the center land portion on the other side in the tire lateral direction to the one side in the tire lateral direction; and the first band-like body forming the sound absorbing member and the second band-like body forming the sound absorbing member are separated from each other by 60% or greater of the width of the center land portion. When a plurality of sound absorbing members are disposed on the tire inner surface, it is necessary to dispose the sound absorbing member in the vicinity of a region corresponding to a shoulder portion. Accordingly, the sound absorbing member disposed in the region may not sufficiently ensure high-speed durability. By disposing the plurality of sound absorbing members on the tire inner surface as described above, heat accumulation during travel at high speeds can be effectively inhibited, and high-speed durability can be increased. In addition, the noise performance and the high-speed durability can be improved in a well-balanced manner.

In an embodiment of the present technology, preferably the sound absorbing member includes a missing portion in at least one section in the tire circumferential direction. Thus, the tire can endure, for a long period of time, expansion due to inflation of the tire or shear strain of an adhering surface due to contact and rolling of the tire.

DETAILED DESCRIPTION

Figure 1:
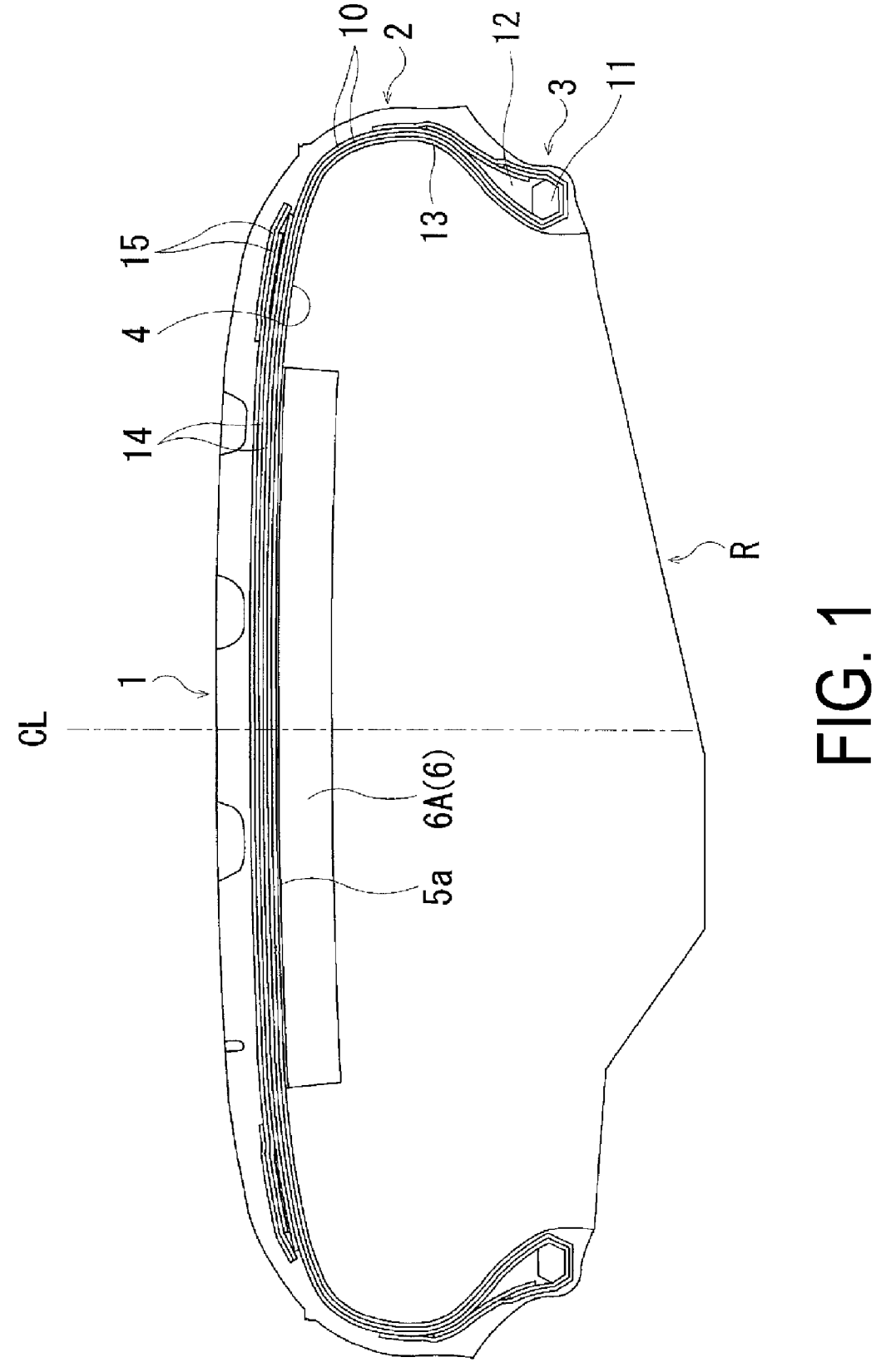
FIG. 1 is a meridian cross-sectional view illustrating a pneumatic tire according to an embodiment of the present technology.
Figure 2:
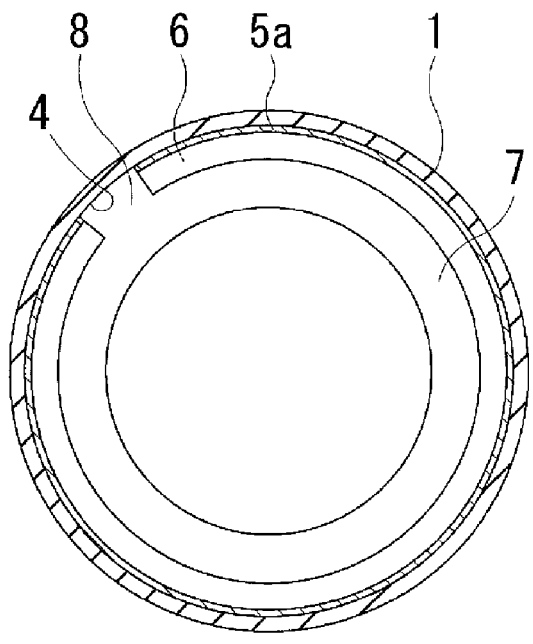
FIG. 2 is a cross-sectional view taken along an equator line of a pneumatic tire according to an embodiment of the present technology.

Configurations of embodiments of the present technology will be described in detail below with reference to the accompanying drawings. FIGS. 1 and 2 illustrate a pneumatic tire according to an embodiment of the present technology. In FIG. 1, the reference sign CL denotes the tire equator.

As illustrated in FIGS. 1 and 2, the pneumatic tire according to the present embodiment includes an annular tread portion 1 extending in the tire circumferential direction, a pair of sidewall portions 2 disposed on opposite sides of the tread portion 1, and a pair of bead portions 3 disposed inward of the sidewall portions 2 in the tire radial direction.

At least one carcass layer 10 is mounted between the pair of bead portions 3, 3. The carcass layer 10 includes carcass cords arranged in the tire radial direction, and organic fiber cords are preferably used as the carcass cords. The carcass layer 10 is turned up around a bead core 11 disposed in each of the bead portions 3 from the inner side to the outer side of the tire. A bead filler 12 having a triangular cross-sectional shape is disposed on the outer circumferential side of each of the bead cores 11. Furthermore, an innerliner layer 13 is disposed in a region between the pair of bead portions 3, 3 on a tire inner surface.

Belt layers 14 are embedded on the outer circumferential side of the carcass layer 10 in the tread portion 1. The belt layers 14 each include a plurality of reinforcing cords that are inclined with respect to the tire circumferential direction, with the reinforcing cords of the different layers arranged in a criss-cross manner. In the belt layers 14, the inclination angle of the reinforcing cords with respect to the tire circumferential direction ranges from, for example, 10° to 40°. Steel cords are preferably used as the reinforcing cords of the belt layers 14. To improve high-speed durability, at least one belt cover layer 15 formed by arranging reinforcing cords at an angle of 5° or less with respect to the tire circumferential direction is disposed on the outer circumferential side of the belt layers 14. Organic fiber cords of nylon, aramid, or the like are preferably used as the reinforcing cords of the belt cover layer 15.

Note that the tire internal structure described above represents a typical example for a pneumatic tire, and the pneumatic tire is not limited thereto.

In the pneumatic tire described above, as illustrated in FIGS. 1 and 2, a sound absorbing member 6 is fixed via an adhesive layer 5a to a region of the tire inner surface 4 corresponding to the tread portion 1 and extends along the tire circumferential direction. The adhesive layer 5a is preferably provided on the entire surface of the sound absorbing member 6. The sound absorbing member 6 is made of a porous material with open cells and has predetermined noise absorbing properties based on the porous structure. Polyurethane foam is preferably used as the porous material of the sound absorbing member 6. In the embodiment illustrated in FIG. 1, the sound absorbing member 6 includes a single band-like body 6A having a rectangular cross-sectional shape.

Figure 3:
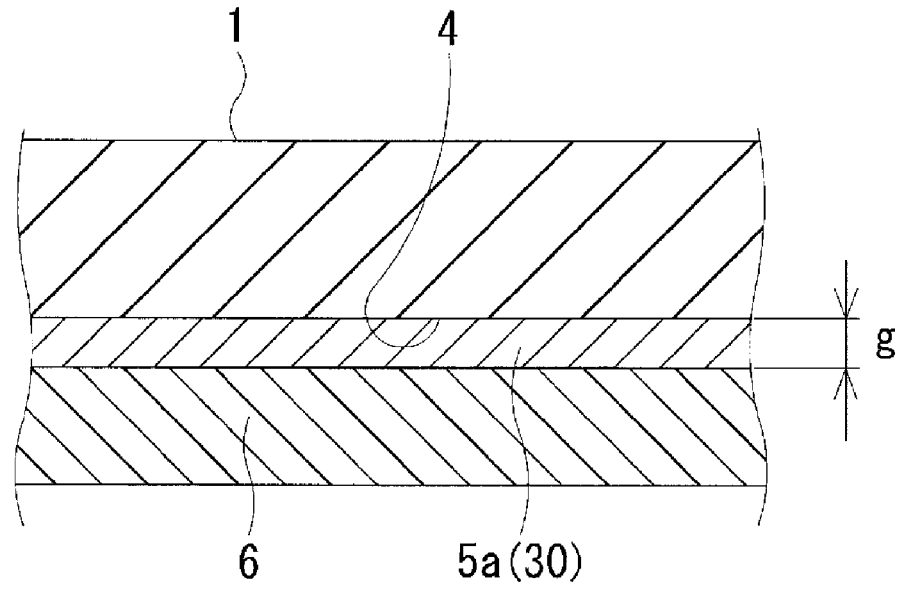
FIG. 3 is a cross-sectional view of a tread portion of a pneumatic tire according to an embodiment of the present technology.

The adhesive layer 5a is double-sided adhesive tape having high adhesive strength. As illustrated in FIG. 3, the adhesive layer 5a is made of a solid pressure-sensitive adhesive 30 without including a base material 31. The adhesive layer 5a does not include the base material 31 and thus the entire thickness can be reduced. The pressure-sensitive adhesive 30 is not particularly limited; however, for example, any one of an acrylic-based pressure-sensitive adhesive, a silicone-based pressure-sensitive adhesive, and a rubber-based pressure-sensitive adhesive can be used as the pressure-sensitive adhesive 30. In particular, an acrylic-based pressure-sensitive adhesive or a silicone-based pressure-sensitive adhesive is desirably used as the pressure-sensitive adhesive 30. The acrylic-based pressure-sensitive adhesive is excellent in heat resistance and thus is suitable for improving high-speed durability. The silicone-based pressure-sensitive adhesive has no temperature dependence of adhesion and is excellent in adhesiveness to the sound absorbing member 6.

Figure 4:
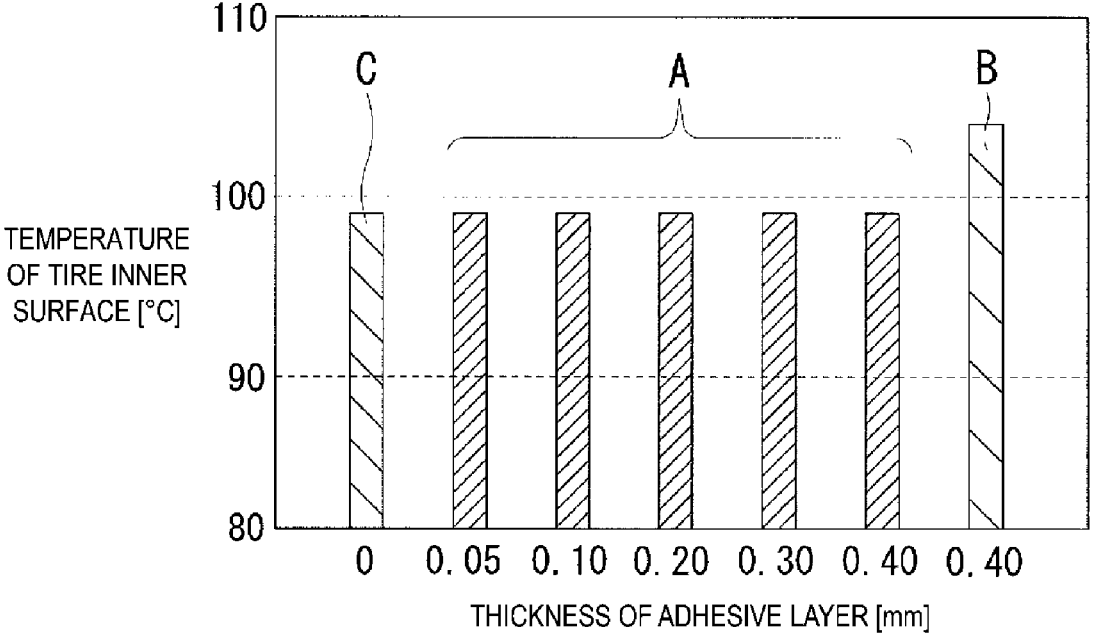
FIG. 4 is a graph indicating, in a case where an adhesive layer is provided on a tire inner surface, the relationship between a thickness (mm) of the adhesive layer and a temperature (° C.) of the tire inner surface at the time of tire failure.

FIG. 4 indicates, in a case where the adhesive layer is provided on the tire inner surface, the relationship between a thickness (mm) of the adhesive layer and a temperature (° C.) of the tire inner surface at the time of tire failure. The results indicated in FIG. 4 are temperatures of the tire inner surface measured at the time of tire failure in a case where the tires were run on a drum testing machine, with only either the adhesive layer 5a made of the pressure-sensitive adhesive 30 without including the sound absorbing member 6 attached on the tire inner surface 4 or the adhesive layer 5b formed of the pressure-sensitive adhesives 30 layered on both surfaces of the base material 31 included, until the tires failed. In FIG. 4, a case where the adhesive layer 5a not including the base material 31 is provided (A in FIG. 4), a case where the adhesive layer 5b including the base material 31 is provided (B in FIG. 4), and for comparison, a case where no adhesive layer is provided (C in FIG. 4) are illustrated. At this time, the entire thickness of the adhesive layer 5b is 0.40 mm, and more specifically, the thickness of each of layers of the pressure-sensitive adhesives 30 is 0.05 mm (two layers being 0.10 mm) and the thickness of the base material 31 is 0.30 mm.

As can be seen from FIG. 4, in the case of the adhesive layer 5a, regardless of the thickness (0.05 mm to 0.40 mm), the temperature of the tire inner surface is the same as the temperature of the tire inner surface in the case of an adhesive layer not being provided. In contrast, in the case of the adhesive layer 5b, the temperature of the tire inner surface is higher compared with the case of the adhesive layer 5a. In other words, the pressure-sensitive adhesive 30 itself hardly generates heat and does not affect the increase in the temperature of the tire inner surface at the time of tire failure. Also, the base material 31 itself generates heat and affects the increase in the temperature of the tire inner surface.

In the aforementioned pneumatic tire, the sound absorbing member 6 is fixed via the adhesive layer 5a to the inner surface of the tread portion 1 along the tire circumferential direction, and the adhesive layer 5a is made of the solid pressure-sensitive adhesive 30 without including the base material 31. Thus, heat release of the tire is not disturbed, and the adhesive layer 5a itself does not generate heat. As a result, deterioration of high-speed durability can be prevented.

The aforementioned pneumatic tire has a configuration in which the average thickness g of the adhesive layer 5a is preferably from 0.05 mm to 5.00 mm and more preferably from 0.05 mm to 1.00 mm. The average thickness g of the adhesive layer 5a is appropriately set as just described, and thus the adhesive layer 5a can follow the unevenness of the tire inner surface 4 and can secure a sufficient adhesive area. Here, when the average thickness g of the adhesive layer 5a is less than 0.05 mm, the sound absorbing member 6 easily separations at the time of load endurance. When the average thickness g of the adhesive layer 5a is greater than 5.00 mm, the weight of the adhesive layer 5a is large, and thus the rolling resistance is likely to deteriorate. Additionally, the average thickness g of the adhesive layer 5a ranging from 1.00 mm to 5.00 mm, and thus the puncture sealing properties can be obtained.

The peeling adhesive strength of the adhesive layer 5a is preferably 5 N/20 mm or greater. The upper limit of the peeling adhesive strength is preferably 100 N/20 mm or lower. The peeling adhesive strength of the adhesive layer 5a is appropriately set as just described, and thus the fixing strength of the sound absorbing member 6 can be maintained well. In addition, the sound absorbing member 6 can be prevented from being detached.

The volume of the sound absorbing member 6 of the aforementioned pneumatic tire is preferably from 10% to 30% with respect to the volume (cavity volume) of a cavity portion 7 formed between the tire and a rim R. Additionally, the width of the sound absorbing member 6 is preferably from 30% to 90% of the tire ground contact width. In this way, the sound absorbing effect of the sound absorbing member 6 can be sufficiently ensured, which leads to an improvement in quietness. When the volume of the sound absorbing member 6 is less than 10% of the cavity volume of the tire, the sound absorbing effect cannot be appropriately obtained. Additionally, when the volume of the sound absorbing member 6 of the cavity volume of the tire is greater than 30%, the noise reduction effect due to cavity resonance plateaus. As a result, the noise reduction effect cannot be further obtained.

As illustrated in FIG. 2, the sound absorbing member 6 preferably includes a missing portion 8 in at least one section in the tire circumferential direction. The missing portion 8 is a portion where the sound absorbing member 6 is not present along the tire circumference. The missing portion 8 is provided in the sound absorbing member 6. This allows for expansion due to inflation of the tire or shear strain of an adhering surface due to contact and rolling to be endured for a long period of time and for shear strain at the adhering surface of the sound absorbing member 6 to be effectively alleviated. One missing portion 8 or three to five missing portions 8 may be provided along the tire circumference. In other words, when two missing portions 8 are provided along the tire circumference, the tire uniformity significantly deteriorates due to mass unbalance, and when the six or more missing positions 8 are provided along the tire circumference, production costs significantly increase.

Note that in a case where two or more missing portions 8 are provided along the tire circumference, the sound absorbing member 6 is divided into portions in the tire circumferential direction. However, even in such a case, for example, the divided portions of the sound absorbing member 6 are connected to each other with another layer member such as the adhesive layer 5a made of double-sided adhesive tape. Thus, the sound absorbing member 6 can be treated as an integral member and can be easily applied to the tire inner surface 4.

Figure 5:
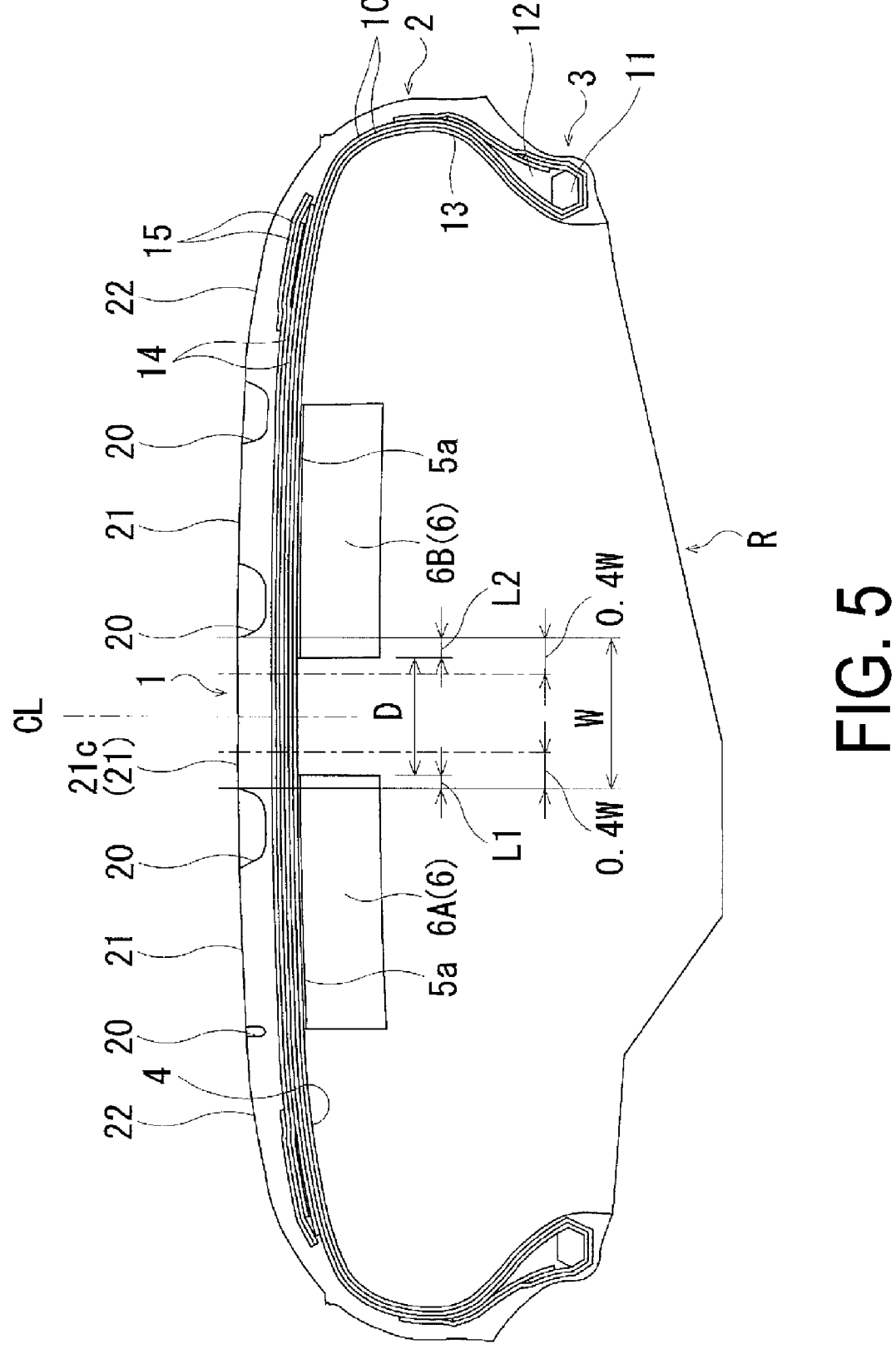
FIG. 5 is a meridian cross-sectional view illustrating a pneumatic tire according to a modified example of an embodiment of the present technology.
Figure 6:
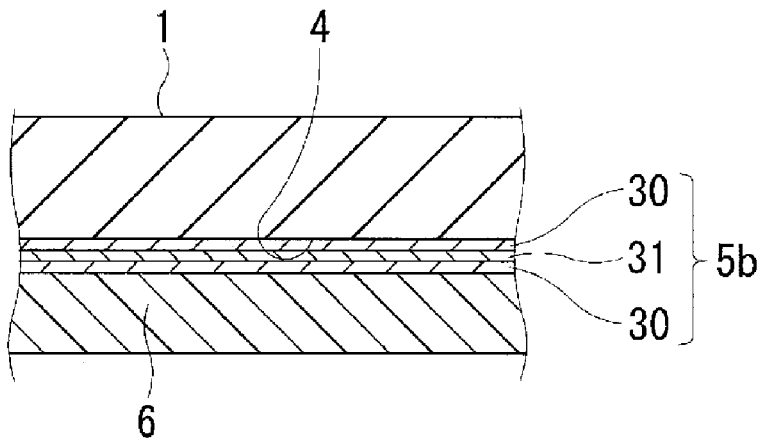
FIG. 6 is a cross-sectional view of a tread portion of a conventional pneumatic tire having a sound absorbing member attached to a tire inner surface.

FIG. 5 illustrates a pneumatic tire according to a modified example of an embodiment of the present technology. As illustrated in FIG. 5, two or more circumferential grooves 20 extending in the tire circumferential direction are formed in the tread portion 1. One or more land portion 21 is defined by the circumferential grooves 20 between two circumferential grooves 20 adjacent in the tire lateral direction, and two (one on either side in the tire lateral direction) shoulder land portions 22 are defined at the tire lateral direction outer sides by the circumferential grooves 20 located outermost in the tire lateral direction. The land portion 21 is required to include a center land portion 21*c* disposed on the tire equator CL and continuously extending around the entire circumference of the tire.

Here, in the embodiment illustrated in FIG. 1, the sound absorbing member 6 includes a single band-like body 6A having a rectangular cross-sectional shape, and the band-like body 6A forming the sound absorbing member 6 is disposed straddling the tire equator CL. In contrast, in the embodiment illustrated in FIG. 5, the sound absorbing member 6 includes a first band-like body 6A and a second band-like body 6B, each having a rectangular cross-sectional shape. The first band-like body 6A forming the sound absorbing member 6 is disposed on one side in the tire lateral direction with respect to a position of 40% of a width W of the center land portion 21*c* from one end portion of the center land portion 21*c* on the one side in the tire lateral direction to the other side in the tire lateral direction. The second band-like body 6B forming the sound absorbing member 6 is disposed on the other side in the tire lateral direction with respect to a position of 40% of the width W of the center land portion 21*c* from one end portion of the center land portion 21*c* on the other side in the tire lateral direction to the one side in the tire lateral direction. In addition, a separation distance D between the first band-like body 6A and the second band-like body 6B is set to be 60% or greater of the width W of the center land portion 21*c*. Additionally, an overlap amount L of the band-shaped bodies 6A, 6B and the center land portion 21*c* (the sum of an overlap amount L1 of the first band-like body 6A and an overlap amount L2 of the second band-like body 6B) is set to be 40% or less of the width W of the center land portion 21*c*.

As described above, in the case where the pair of sound absorbing members 6 including the first band-like body 6A and the second band-like body 6B is applied, the pair of sound absorbing members 6 is disposed separated from each other so that heat is most easily generated in the tread portion 1, and the sound absorbing members 6 are directly attached at a position located away from the inner surface side of the center land portion 21*c* where heat accumulation is likely to occur; heat accumulation during travel at high speeds can be effectively inhibited, and the high-speed durability can be enhanced. In addition, the noise performance and the high-speed durability can be improved in a well-balanced manner.

The first band-like body 6A or the second band-like body 6B is disposed on the one side or the other side in the tire lateral direction with respect to the position 40% of the width W of the center land portion 21*c* from one end portion or the other end portion of the center land portion 21*c* in the tire lateral direction to the other side or the one side in the tire lateral direction. Note that, such structure includes the case where the end portion of the first band-like body 6A or the end portion of the second band-like body 6B on the inner side in the tire lateral direction matches with a position of 40% of the width W of the center land portion 21*c* from the one end or the other end of the center land portion 21*c* in the tire lateral direction to the other side or to the one side in the tire lateral direction.

8

Examples

Pneumatic tires according to Examples 1 to 6 were manufactured. The pneumatic tires have a tire size of 275/35ZR20 and include an annular tread portion extending in the tire circumferential direction, a pair of sidewall portions disposed on opposite sides of the tread portion, a pair of bead portions disposed inward of the sidewall portions in the tire radial directions, and a sound absorbing member attached via an adhesive layer to the inner surface of the tread portion along the tire circumferential direction, the adhesive layer being formed of a solid pressure-sensitive adhesive without including a base material. In Examples 1 to 6, the thickness (mm) of the adhesive layer was set as indicated in Table 1.

For comparison, a tire according to a Conventional Example was prepared in which a sound absorbing member is not attached to a tire inner surface. Additionally, a tire according to a Comparative Example having the same structure as that of Example 1 except that adhesive layers are laminated on both sides of a base material was prepared.

The high-speed durability, the load durability, the rolling resistance, and the puncture sealing properties were evaluated for each of the test tires in accordance with the following test methods. The results are also indicated in Table 1.

High-Speed Durability:

Each of the test tires was mounted on a wheel having a rim size of 20×9½ J, and in a state where a 85% load of the maximum load capacity defined by JATMA was applied, a running test was performed on the tire using a drum testing machine under the condition of air pressure of 360 kPa. Specifically, an initial speed of 250 km/h was used, and the speed was increased by 10 km/h every ten minutes. The tires were ran until the tires failed, and the reaching step (speed) was measured. The larger the reaching step (speed) is, the more superior the high-speed durability is.

Load Durability:

Each of the test tires was mounted on a wheel having a rim size of 20×9½ J, and in a state where a 160% load of the maximum load capacity defined by JATMA was applied, a running test was performed on the tire using a drum testing machine under the conditions: running speed of 81 km/hour, air pressure of 350 kPa, and running time of 240 hours. After testing, the presence of separation of the sound absorbing member on the contact surface was visually confirmed.

Rolling Resistance:

Each of the test tires was mounted on a wheel having a rim size of 20×9½ J, and inflated to air pressure of 230 kPa. Rolling resistance was measured in accordance with ISO28580 using a drum testing machine having a drum diameter of 1707 mm. The evaluation results are represented with the use of reciprocals of the measurement values and by index values with the value of Comparative Evaluate being assigned 100. Higher index values indicate lower rolling resistance. Note that when the index value is "98" or greater, the conventional level for rolling resistance is maintained.

Puncture Sealing Properties:

A puncture hole was formed in the tread portion of each of the test tires, and the tires were filled with air so that the tire internal pressure was 250 kPa in standard conditions (temperature 23° C., relative humidity 50%). Then, air pressure was measured, and whether air leaked was confirmed.

9

TABLE 1-1

| | Conventional Example | Comparative Example | Example 1 | Example 2 |
|---|---|---|---|---|
| Presence of sound absorbing member | No | Yes | Yes | Yes |
| Presence of base material in adhesive layer | — | Yes | No | No |
| Adhesive layer thickness (mm) | — | 0.04 | 0.04 | 0.05 |
| High-speed durability (km/h) | 360 | 340 | 350 | 350 |
| Load durability | — | Separation | Separation | No separation |
| Rolling resistance | — | 100 | 100 | 100 |
| Puncture sealing properties | — | Air leakage Yes | Air leakage Yes | Air leakage Yes |

TABLE 1-2

| | Example 3 | Example 4 | Example 5 | Example 6 |
|---|---|---|---|---|
| Presence of sound absorbing member | Yes | Yes | Yes | Yes |
| Presence of base material in adhesive layer | No | No | No | No |
| Adhesive layer thickness (mm) | 0.40 | 1.00 | 5.00 | 6.00 |
| High-speed durability (km/h) | 350 | 350 | 350 | 350 |
| Load durability | No separation | No separation | No separation | No separation |
| Rolling resistance | 100 | 100 | 98 | 97 |
| Puncture sealing properties | Air leakage Yes | Air leakage No | Air leakage No | Air leakage No |

As can be seen from Table 1, in comparison with the Comparative Example, the high-speed durability was improved in Examples 1 to 6.

In particular, in Examples 2 to 6 in which the thickness of the adhesive layer was set to be 0.05 mm or greater, the load durability was also improved. Furthermore, in Examples 1 to 5 in which the thickness of the adhesive layer was set to be 5.00 mm or less, the rolling resistance was maintained at a level similar to that of the Comparative Example. Furthermore, in Examples 4 to 6 in which the thickness of the adhesive layer was set ranging from 1.00 mm to 6.00 mm, the tire had puncture sealing properties.

The invention claimed is:

1. A pneumatic tire comprising:
a tread portion extending in a tire circumferential direction and having an annular shape;
a pair of sidewall portions disposed on opposite sides of the tread portion; and
a pair of bead portions disposed inward of the sidewall portions in a tire radial direction; wherein
a sound absorbing member is fixed via an adhesive layer to an inner surface of the tread portion along the tire circumferential direction,
the adhesive layer comprises a solid pressure-sensitive adhesive without including a base material, and
the adhesive layer has an average thickness of from 0.45 mm to 0.95 mm.

2. The pneumatic tire according to claim 1, wherein the adhesive layer has a peeling adhesive strength of 5 N/20 mm or greater.

3. The pneumatic tire according to claim 1, wherein the sound absorbing member has a volume from 10% to 30% of a cavity volume of the tire.

4. The pneumatic tire according to claim 1, wherein the sound absorbing member comprises a single band-like body having a rectangular cross-sectional shape,
the band-like body forming the sound absorbing member is disposed straddling a tire equator, and
the single band-like body extends along the tire circumferential direction.

5. The pneumatic tire according to claim 1, further comprising a center land portion disposed on the tread portion on a tire equator and continuously extending around the tread portion around an entire tire circumference; and wherein
the sound absorbing member comprises a first band-like body and a second band-like body, each one having a rectangular cross-sectional shape;
the first band-like body forming the sound absorbing member is disposed on one side in a tire lateral direction with respect to a position of 40% of a width of the center land portion from one end portion of the center land portion on the one side in the tire lateral direction to the other side in the tire lateral direction;
the second band-like body forming the sound absorbing member is disposed on the other side in the tire lateral direction with respect to a position of 40% of the width of the center land portion, the position being 40% of the width from one end portion of the center land portion on the other side in the tire lateral direction to the other side in the tire lateral direction;
the first band-like body forming the sound absorbing member and the second band-like body forming the sound absorbing member are separated from each other by 60% or greater of the width of the center land portion; and
the first band-like body forming the sound absorbing member and the second band-like body extend along the tire circumferential direction.

6. The pneumatic tire according to claim 1, wherein the sound absorbing member comprises a missing portion in at least one section in the tire circumferential direction.

7. The pneumatic tire according to claim 1, wherein the adhesive layer has a peeling adhesive strength of 5 N/20 mm or greater.

8. The pneumatic tire according to claim 7, wherein the sound absorbing member has a volume from 10% to 30% of a cavity volume of the tire.

9. The pneumatic tire according to claim 8, wherein the sound absorbing member comprises a single band-like body having a rectangular cross-sectional shape,
the band-like body forming the sound absorbing member is disposed straddling a tire equator, and
the single band-like body extends along the tire circumferential direction.

10. The pneumatic tire according to claim 9, wherein the sound absorbing member comprises a missing portion at at least one section in the tire circumferential direction.

11. The pneumatic tire according to claim 8, further comprising a center land portion disposed on the tread portion on a tire equator and continuously extending around the tread portion around an entire tire circumference; and wherein
the sound absorbing member comprises a first band-like body and a second band-like body, each one having a rectangular cross-sectional shape;
the first band-like body forming the sound absorbing member is disposed on one side in a tire lateral direction with respect to a position of 40% of a width of the center land portion from one end portion of the center land portion on the one side in the tire lateral direction to the other side in the tire lateral direction;

the second band-like body forming the sound absorbing member is disposed on the other side in the tire lateral direction with respect to a position of 40% of the width of the center land portion, the position being 40% of the width from one end portion of the center land portion on the other side in the tire lateral direction to the other side in the tire lateral direction;

the first band-like body forming the sound absorbing member and the second band-like body forming the sound absorbing member are separated from each other by 60% or greater of the width of the center land portion; and the first band-like body forming the sound absorbing member and the second band-like body extend along the tire circumferential direction.

12. The pneumatic tire according to claim 11, wherein the sound absorbing member comprises a missing portion in at least one section in the tire circumferential direction.

13. The pneumatic tire according to claim 1, wherein the sound absorbing member has a volume from 22% to 30% of a cavity volume of the tire.

\* \* \* \* \*